United States Patent
Koo et al.

(10) Patent No.: US 7,991,420 B2
(45) Date of Patent: Aug. 2, 2011

(54) DYNAMIC RS COVERAGE IN MULTI-HOP CELLULAR NETWORKS

(75) Inventors: Changjoi Koo, Plano, TX (US); Purva R. Rajkotia, Iselin, NJ (US); Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1067 days.

(21) Appl. No.: 11/505,253

(22) Filed: Aug. 16, 2006

(65) Prior Publication Data

US 2007/0184869 A1 Aug. 9, 2007

Related U.S. Application Data

(60) Provisional application No. 60/771,617, filed on Feb. 8, 2006.

(51) Int. Cl.
H04B 7/00 (2006.01)
H04B 7/15 (2006.01)
(52) U.S. Cl. ...................... 455/522; 455/11.1
(58) Field of Classification Search ............ 455/445, 455/417, 436, 446, 448, 452.1, 452.2, 453, 455/454, 451, 562.1, 114.2
See application file for complete search history.

(56) References Cited

U.S. PATENT DOCUMENTS

| | | | |
|---|---|---|---|
| 2001/0031624 A1* | 10/2001 | Schmutz | 455/13.4 |
| 2002/0045461 A1* | 4/2002 | Bongfeldt | 455/522 |
| 2004/0229621 A1* | 11/2004 | Misra | 455/445 |
| 2005/0176419 A1* | 8/2005 | Triolo et al. | 455/423 |
| 2005/0250453 A1* | 11/2005 | Lastinger et al. | 455/63.4 |
| 2006/0068849 A1* | 3/2006 | Bernhard et al. | 455/562.1 |
| 2006/0182067 A1* | 8/2006 | Rinne et al. | 370/335 |
| 2008/0268855 A1* | 10/2008 | Hanuni et al. | 455/445 |
| 2008/0305740 A1* | 12/2008 | Horiuchi et al. | 455/11.1 |

FOREIGN PATENT DOCUMENTS

WO WO-2005/002109 A2 1/2005

* cited by examiner

*Primary Examiner* — Melody Mehrpour

(57) ABSTRACT

For use in a wireless network, a controller for relay stations. The relay station increases cell coverage and user data rates while employing power consumption saving techniques. The relay station compares a threshold power setting with a current power setting. If the threshold power setting is greater than the current power setting, the relay station increments the threshold power setting and decreases the cell coverage. If the threshold power setting is less than or equal to the current power setting, the relay station decreases the threshold power setting until the threshold power setting is equal to a total power setting of the relay station. The relay station also employs load balancing techniques by comparing a threshold power setting with a current load setting. If the threshold power setting is greater than the current load setting, the relay station increases the cell coverage based on the available bandwidth.

20 Claims, 3 Drawing Sheets

DYNAMIC RS COVERAGE IN MULTI-HOP CELLULAR NETWORKS

CROSS-REFERENCE TO RELATED APPLICATION AND CLAIM OF PRIORITY

The present application is related to U.S. Provisional Patent No. 60/771,617, filed Feb. 8, 2006, entitled "DYNAMIC RS COVERAGE IN THE MULTI-HOP CELLULAR NETWORKS". U.S. Provisional Patent No. 60/771,617 is assigned to the assignee of the present application and is hereby incorporated by reference into the present disclosure as if fully set forth herein. The present application hereby claims priority under 35 U.S.C. §119(e) to U.S. Provisional Patent No. 60/771,617.

TECHNICAL FIELD OF THE INVENTION

The present application relates generally to wireless communication networks and, more specifically, to signal relay stations.

BACKGROUND OF THE INVENTION

Relay stations are added to wireless communications networks to increase the coverage range, user data rates, or both, at the periphery of the cellular coverage area. A multi-hop network facilitates communication between a base station and mobile stations in the extended coverage area provided by a relay station. Relay stations typically boost the downlink (base station to mobile user) and uplink (mobile user to base station) signals regardless of whether the relay station is fixed or mobile. Current systems, however, fail to effectively increase relay system coverage while employing power saving mechanisms for the relay station. Moreover, there are no procedures currently available for effectively controlling load conditions, such as the number of user traffic channels supported and the user data rates.

There is therefore a need in the art for an improved relay station. In particular, there is a need for a system to effectively and efficiently increase coverage and user data rates while employing power saving mechanisms for the relay station.

SUMMARY OF THE INVENTION

The present disclosure provides a technique for extending the coverage of a relay station with minimal power usage.

In one embodiment of the disclosure, a method is provided for managing cell coverage in a wireless network having a relay station in communication with a mobile station. The method includes comparing a threshold power setting of a relay station with a current power setting of the relay station. When the threshold power setting is greater than the current power setting, the method includes incrementing the threshold power setting and decreasing the cell coverage.

In another embodiment of the disclosure, a method is provided for managing cell coverage in a wireless network having a relay station in communication with a mobile station. The method includes comparing a threshold power setting of a relay station with a current load setting of the relay station. When the threshold power setting is greater than the current load setting, the method includes increasing the cell coverage.

In still another embodiment, a relay station is provided for use in a wireless network. The relay station includes a controller. The controller is capable of comparing a threshold power setting of a relay station with a current power setting of the relay station. When the threshold power setting is greater than the current power setting, the controller increments the threshold power setting; and decreases the cell coverage. If, however, the threshold power setting is less than or equal to the current power setting, the controller decrements the threshold power setting until the threshold power setting is equal to a total power setting of the relay station and increases cell coverage.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
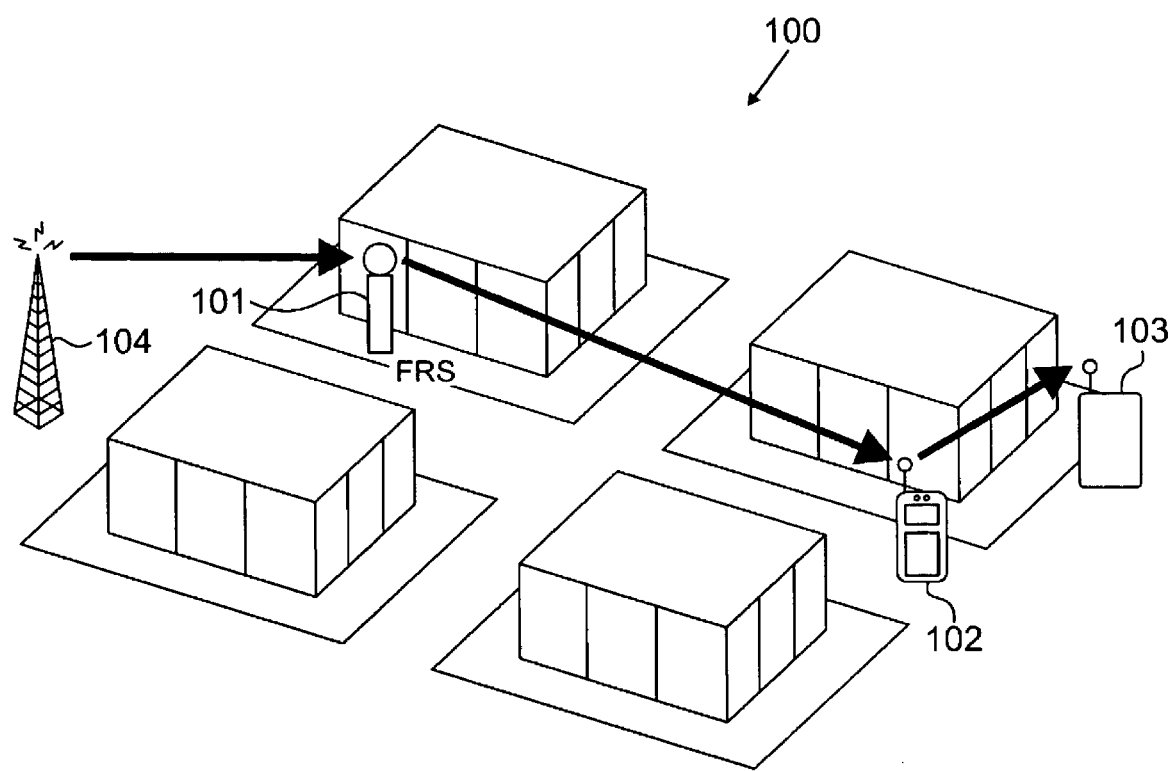
FIG. 1 illustrates a multi-hop cellular network according to one embodiment of the present disclosure.
Figure 2:
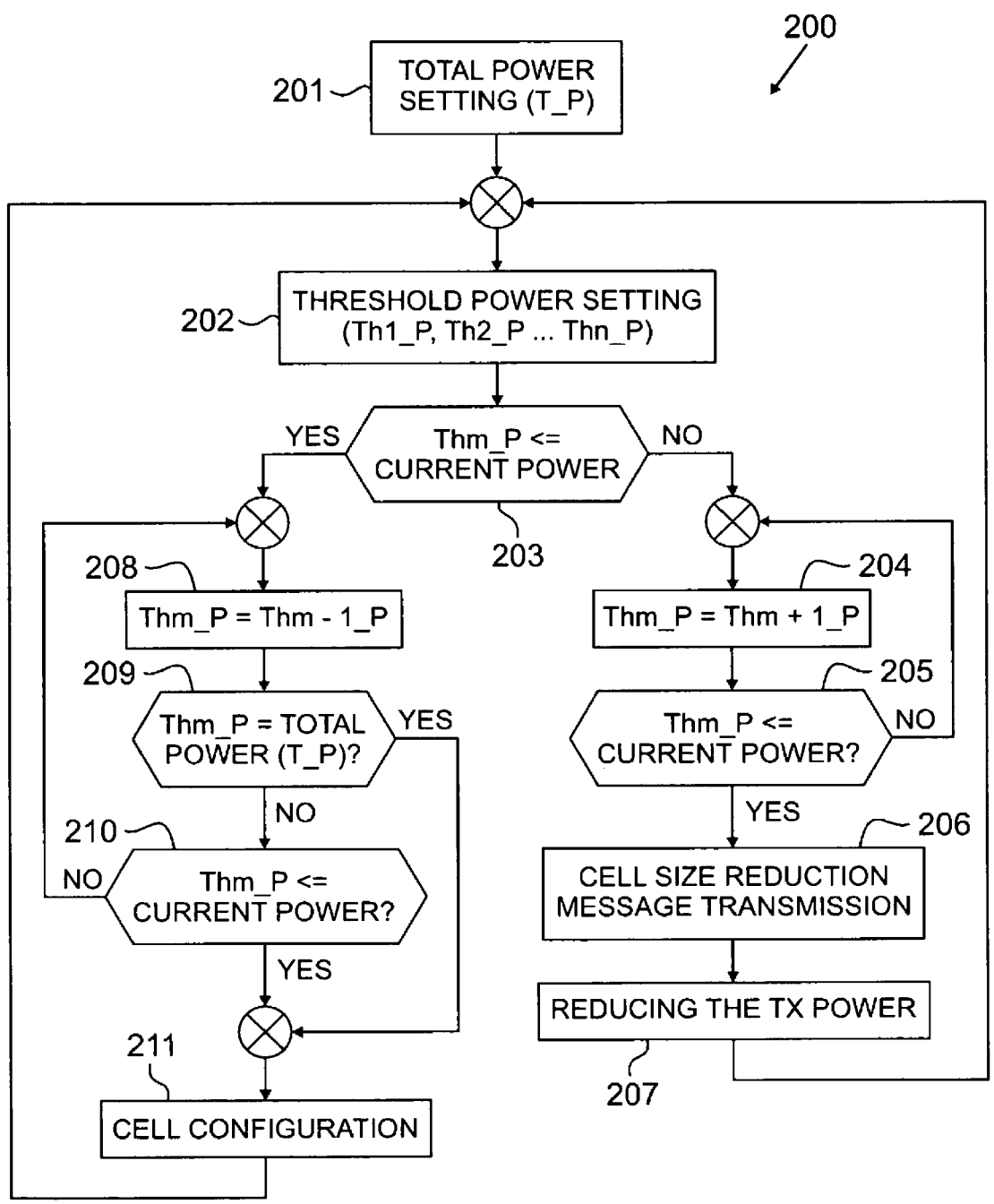
FIG. 2 is a flow diagram illustrating the operation of the multi-hop cellular network according to one embodiment of the present disclosure.
Figure 3:
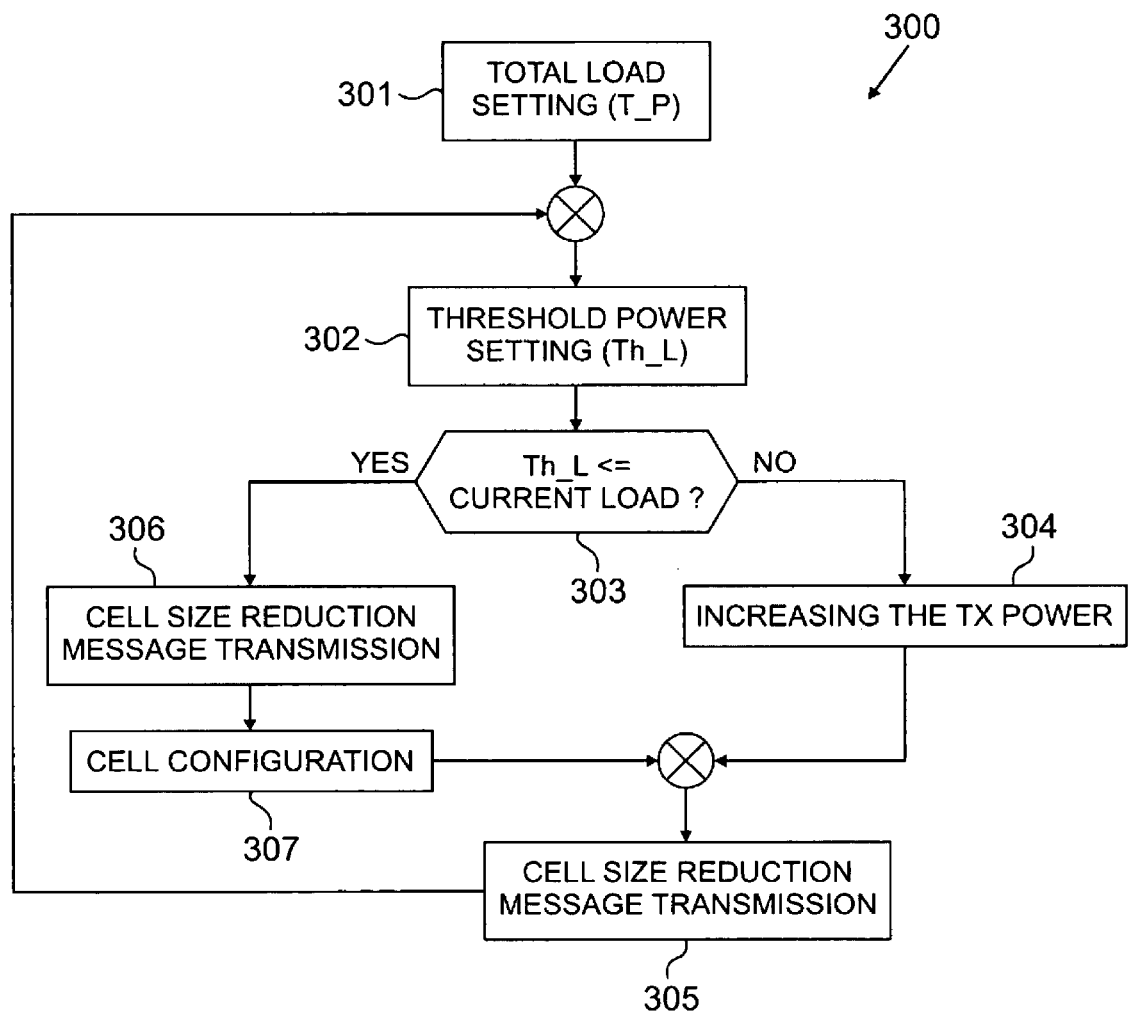
FIG. 3 is a flow diagram illustrating the operation of the multi-hop cellular network according to another embodiment of the disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

FIG. 1 illustrates an exemplary multi-hop cellular network 100 according to an embodiment of the present disclosure. Multi-hop cellular network 100 preferably includes the use of, for example, a fixed relay station (FRS) 101 and a mobile relay station (MRS) 102. Multi-hop cellular network 100 forms a multi-hop link between a base station (BS) 104 and a mobile station (MS) 103 served by BS 104. Multi-hop cellular network 100 extends the coverage range, user data rates and coverage area of a base station (BS) 104. Multi-hop cellular network 100 provides a method and procedure for coverage or range expansion, load control and balancing, and power savings for the relay station. In addition, FRS 101 and MRS 102 may extend the coverage of a cellular network 100 by providing transmission and reception links for other mobile stations (not shown) served by BS 104.

According to one embodiment of the present disclosure, FRS 101 is hard-wired to the base station 104, while MRS 102 is preferably wirelessly connected to BS 104. Alternatively, FRS 101 may be a nomadic relay station wirelessly connected to BS 104. Although the following primarily describes embodiments of the present disclosure in conjunction FRS 101, it should be understood that other suitable relay stations, such as relay station MRS 102, may also be used.

The transmission power level of FRS 101 is power controlled to keep the power level at a minimum while allowing communication with base stations. Thus, in accordance with one embodiment of the present disclosure, FRS 101 effectively reduces interference within the network and thus increases the capacity of cellular network 100. In one embodiment of the present disclosure, FRS 101 generally includes two modes of operation.

In the first operation mode, the available power level for FRS 101 is kept relatively low. In accordance with one embodiment of the disclosure, FRS 101 may accordingly reduce the transmit power level (TX) or reduce the user data rate. Preferably, different thresholds are defined for the operation. In the first threshold, FRS 101 transmits the signal to mobile stations, such as MS 103, in the cell in order to indicate the reduction of the cell coverage. Accordingly, the mobile stations handoff to a neighboring cell or relay station.

In the second threshold, FRS 101 reduces the transmit power level without indication to the cell and goes into a stable state. If a mobile station is still able to lock onto FRS 101, then operation with FRS 101 at a reduced power level is still possible. When in the nth threshold (i.e., perhaps after several thresholds), the mobile station can be placed and activated based on the FRS 101 capability and message structures used in FRS 101. Unless the FRS 101 is supplied with power, FRS 101 will not power up even without an explicit indication by a base station, such as BS 104, that the power has been decreased.

In a second operation mode in accordance with one embodiment of the present disclosure, after the available load for FRS 101 reaches a maximum, FRS 101 may reduce the transmit power level to reduce the bandwidth requested from the mobile stations in the cell. In the first threshold, upon calculating the available bandwidth, FRS 101 may reduce the transmit power in order to indicate the reduction of the cell coverage so that the mobile stations start performing handoffs to the neighbor cell or RS. In the nth threshold, several numbers of thresholds can be placed and activated based on the capability of the relay station.

In addition, thresholds may be determined by any message structure used in the relay station after the load on the relay station has dropped to a certain level. If certain conditions are met, the relay station starts powering up. Accordingly, there is no need for an explicit indication by the base station that the power has decreased. A relay station, thus, retains the power level at a minimum while effectively reducing interference and increasing capacity.

FIG. 2 is a simplified flow diagram illustrating an exemplary method 200 for operating of a multi-hop cellular network, such as network 100, according to one embodiment of the present disclosure. In step 201, a relay station, such as FRS 101, is set to operate at a maximum operating power, or Total Power Setting (T_P). Although the following describes method 200 in conjunction with FRS 101, it should be understood that any suitable relay station, such as for example, MRS 102, may also be used.

In step 202, FRS 101 sets the operating power to one of several thresholds (n) ranging from, for example, Th1_P down to Thn_P, where Th1_P is the highest operating power threshold and Thn_P is the lowest operating power threshold. The granularity of the threshold increases with any increase in the threshold number (n). For example, operating power Th_1 is less granular than operating power Th_2. The number of thresholds (n) and their associated power levels may be implemented based upon the capability of FRS 101 and any other operator requirements.

In step 203, FRS 101 compares the current power level with the threshold power level set in step 202. If the threshold power level (Thm_P) is less than or equal to the current power level, then method 200 continues with step 208 by generally increasing cell coverage. Otherwise, FRS 101 performs the operation in step 204 by generally decreasing cell coverage.

In step 204, a base station, such as BS 104, decreases cell coverage based on the current power level in order to conserve power consumption. In other words, FRS 101 increases the threshold power level Thm_P in step 204 to Thm+1_P until the threshold power Thm_P is equal to the current power in step 205. After the threshold power level Thm_P equals to the current power level in step 205, FRS 101 transmits a message indicating that the cell size has reduced in step 206. FRS 101 reduces the current cell coverage by reducing the transmission power in step 207.

When the mobile stations within the cell, such as MS 103, receive the message, MS 103 should undergo handoff to a neighboring relay station or base station if the pilot signal transmitted from the relay or base station is insufficient. Accordingly, FRS 101 maintains its performance while achieving power saving. After reducing the transmit power in step 207, method 200 returns to step 202.

On the other hand, if in step 203, the threshold power level (Thm_P) in step 202 is less than or equal to the current power level, method 200 continues with step 208 by generally increasing cell coverage. Specifically, in step 208, FRS 101 decreases the threshold power, Thm_P, to Thm−1_P. In step 209, FRS 101 compares the current power level with the threshold power, Thm_P, from step 208. If the threshold power level from step 208 is equal to the total power (T_P), method 200 continues with step 211 and increases cell configuration.

Otherwise, if the threshold power level from step 208 is not equal to the total power (T_P) then, in step 210, method 200 continues with step 211 and re-adjusts the threshold power level in step 208 as described above. Accordingly, method 200 provides, for example, a relay station with the ability to provide transmission and reception links for other mobile station by effectively extending coverage with minimal power usage by analyzing power levels.

FIG. 3 illustrates exemplary method 300 to provide a relay station, such as FRS 101, with a method of conserving power by evaluating the current load conditions in accordance with one embodiment of the present disclosure. Method 300 begins by setting the loading capacity of FRS 101 in step 301. Although the following describes method 300 in conjunction with FRS 101, it should be understood that any suitable relay station, such as for example, MRS 102, may also be used.

Generally, FRS 101 sets the Total Load (T_L) at a maximum level depending on the loading capability of FRS 101. In step 302, FRS 101 may set the threshold power setting ranging from, for example, Th1_L through Thn_L. The granularity of the threshold level is based on the particular application.

However, assuming FRS 101 has only one threshold in this example, method 300 continues by assessing whether the threshold power setting (Th_L) is less than or equal to the current load in step 303. If so, method 300 continues in step 306.

Otherwise, if the threshold power setting (Th_L) is greater than the current load, method 300 continues in step 304 by increasing the transmit power to expand the cell coverage (assuming that FRS 101 has available bandwidth). In step 305, FRS 101 calculates the total bandwidth being served in the cell. Based on this calculation, FRS 101 may adjust the cell coverage by comparing the threshold and available bandwidth. Method 300 continues with step 302.

If in step 303, the threshold power setting (Th_L) is less than or equal to the current load, method 300 continues with step 306. In step 306, FRS 101 structures and transmits the message with cell size reduction indication. FRS 101 preferably reduces the cell size by the reducing the transmit power level. When the mobile stations receive this message, the mobile stations should undergo handoff.

In step 307, FRS 101 decreases the transmitted power in order to reduce the cell coverage upon sending the message. Because RS 101 has more bandwidth, FRS 101 should reduce the bandwidth for regulating the cell capacity through load balancing. If the cell coverage is reduced, the number of mobiles stations may also decrease and the bandwidth, thus load in the cell, can be regulated in step 305. Method 300 continues with step 302. Accordingly, method 300 provides, for example, a load balancing technique for relay stations Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network having a relay station that facilitates communication between a base station and a mobile station, a method of managing cell coverage comprising:
    comparing a threshold power setting of a relay station with a current power setting of the relay station; and
    when the threshold power setting is greater than the current power setting:
        changing the threshold power setting to a next threshold power setting in a series of threshold power settings, the next threshold power setting representing a lower operating power;
        decreasing a cell coverage; and
        transmitting a message to the mobile station indicating that the cell coverage has decreased.

2. The method of claim 1, wherein decreasing the cell coverage is accomplished by reducing a transmit power of the relay station.

3. The method of claim 1, wherein changing the threshold power setting to the next threshold power setting continues until the threshold power setting is equal to the current power setting.

4. The method of claim 3 wherein a granularity of each threshold power setting increases with a progression along the series of threshold power settings.

5. The method of claim 4 further comprising:
    handing off the mobile station to a second relay station.

6. The method of claim 1 further comprising:
    when the threshold power setting is less than or equal to the current power setting,
        changing the threshold power setting to a previous threshold power setting in the series of threshold power settings, the previous threshold power setting representing a higher operating power; and
        increasing cell coverage.

7. The method of claim 6, wherein changing the threshold power setting to the previous threshold power setting continues until the threshold power setting is equal to a total power setting of the relay station.

8. For use in a wireless network having a relay station that facilitates communication between a base station and a mobile station, a method of managing cell coverage comprising:
    comparing a threshold power setting of a relay station with a current load setting of the relay station; and
    when the threshold power setting is less than or equal to the current load setting:
        decreasing the cell coverage; and
        transmitting a message to the mobile station indicating that the cell coverage has decreased.

9. The method of claim 8, wherein decreasing the cell coverage is accomplished by reducing the transmit power of the relay station.

10. The method of claim 9 further comprising:
    calculating a total bandwidth being served by the cell.

11. The method of claim 10 further comprising:
    comparing the threshold power with the total bandwidth; and
    adjusting the cell coverage based on the comparison.

12. The method of claim 8 further comprising:
    when the threshold power setting is greater than the current load setting, increasing the cell coverage.

13. The method of claim 12, wherein increasing the cell coverage is accomplished by increasing the transmit power of the relay station.

14. The method as set forth in claim 8, wherein the relay station is a mobile relay station.

15. The method as set forth in claim 8 further comprising:
    handing off the mobile station to a second relay station.

16. For use in a wireless network having a relay station that facilitates communication between a base station and a mobile station, the relay station comprising:
    a controller capable of:
        comparing a threshold power setting of a relay station with a current power setting of the relay station; and
        when the threshold power setting is greater than the current power setting:
            changing the threshold power setting to a next threshold power setting in a series of threshold power settings, the next threshold power setting representing a lower operating power;
            decreasing the cell coverage; and
            transmitting a message to the mobile station indicating that the cell coverage has decreased; and
        when the threshold power setting is less than or equal to the current power setting:
            changing the threshold power setting to a previous threshold power setting in the series of threshold power settings until the threshold power setting is equal to a total power setting of the relay station; and
            increasing cell coverage.

17. The relay station of claim 16, wherein decreasing the cell coverage is accomplished by reducing a transmit power of the relay station.

18. The relay station of claim 16, wherein changing the threshold power setting to the next threshold power setting continues until the threshold power setting is equal to the current power setting.

19. The relay station of claim 18 wherein the relay station is a mobile relay station.

20. The relay station of claim 19 further comprising:
    handing off the mobile station to a second relay station.

* * * * *